March 14, 1933.  H. L. KUHN  1,901,173
DIRIGIBLE AIRPLANE
Filed March 4, 1932  4 Sheets-Sheet 1

Fig. 1.

INVENTOR.
HERMAN L. KUHN.
BY
Albert F. Dieterich
ATTORNEYS.

March 14, 1933.   H. L. KUHN   1,901,173
DIRIGIBLE AIRPLANE
Filed March 4, 1932   4 Sheets-Sheet 3

Fig. 3.

INVENTOR.
HERMAN L. KUHN
BY
ATTORNEYS.

March 14, 1933.  H. L. KUHN  1,901,173
DIRIGIBLE AIRPLANE
Filed March 4, 1932    4 Sheets-Sheet 4

INVENTOR.
HERMAN L. KUHN.
BY
ATTORNEYS.

Patented Mar. 14, 1933

1,901,173

UNITED STATES PATENT OFFICE

HERMAN L. KUHN, OF UNION, MISSISSIPPI, ASSIGNOR OF FIFTY PER CENT TO W. H. COFFEY, OF LUDLOW, MISSISSIPPI

DIRIGIBLE-AIRPLANE

Application filed March 4, 1932. Serial No. 596,843.

My invention relates to the art of aerial navigation and it particularly has for an object to provide an improved combined airplane and dirigible balloon whereby a more practical means is provided than heretofore, for preventing the airplane from nose-diving and falling when the propeller is at rest in flight, and whereby the safety factor is greatly increased.

Further, it is an object to provide an improved means to prevent an airplane from sinking should it alight on water and to provide means whereby it may alight either on water or land at will.

Further, it is an object to provide an improved means to enable an airplane to take off without the long runs over the field that are now required with airplanes not equipped with my invention.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

In the drawings in which like numerals of reference designate like parts in all the figures, 1 represents a bi-plane of any standard type, the partial or total weight of which by my invention is taken up by lifting balloons 2, 3 and 4.

The balloon 2 is the main one and is mounted over the airplane. The balloons 3 are mounted in parallelism adjacent the landing gear of the airplane and cooperate therewith, while the balloon 3 is mounted beneath the tail of the airplane and cooperates with the usual tail skid.

The several balloons 2, 3 and 4 are made of flexible material similar to that used in the flying balloon construction.

The main balloon 1 is placed inside of a rigid frame structure 5 which is formed by a series of wood bars 6 and 7, the bars 6 extending horizontally as a belt course, while the bars 7 lie in a vertical plane above and below the balloon envelope. The bars 6 and 7 have their front and rear ends bent to follow the contour of the balloon and at their front and rear ends they are united by metallic fittings or braces 8 to which they are fastened by screws or rivets as indicated.

These bars are mounted in spaced relation and are strengthened by the wood loops 9. These loops are secured to the bars by the metallic fittings or clamps 10 at each side and are fastened by screws or rivets as shown. The loops 9 are also clamped to the upper bar 6 by suitable fittings 11.

Beneath the balloon the loops 9 are linked together crosswise for strengthening purposes by the wooden cross bars 12. These bars are fastened at their ends to the opposite sides of the loops by the T-shaped fittings or brackets 13, also composed of metal, the parts being fastened together by screws or rivets as indicated. Each cross bar 12 is also fastened to the lower bar 4 by the metallic fittings or clamps 14.

The lower ends of the front pair of loops 9 are fastened to the upper wing 15 and, when the dimensions permit, they are secured also to the lower wing 16 of the airplane. In this case these loops pass through the upper wing and the ends are secured to the lower wing.

The ends of the loops 9 are fastened by the cross clamps 17 at each side to cross bars 18 of pipe or wood. These cross bars 18 are secured rigidly to the fuselage of the airplane in any suitable way.

19 is a cord net which is shaped to conform to the upper half of the balloon surface and has a border rope or reinforced edge 20 by which it may be tied to the side bars 7 of the framing by heavy cord 21 as shown.

In order to protect the balloon head against air pressure which would tend to flatten the balloon head and in order also to pass the air stream by the balloon head without encountering obstructions that would increase the air resistance, I provide a light concave plate 22 which forms a cap for the front end of the balloon and its rigid frame. This cap is formed with recesses 23 so as not to interfere with the space needed for the cord 21 and the front brace 8.

Figure 3:
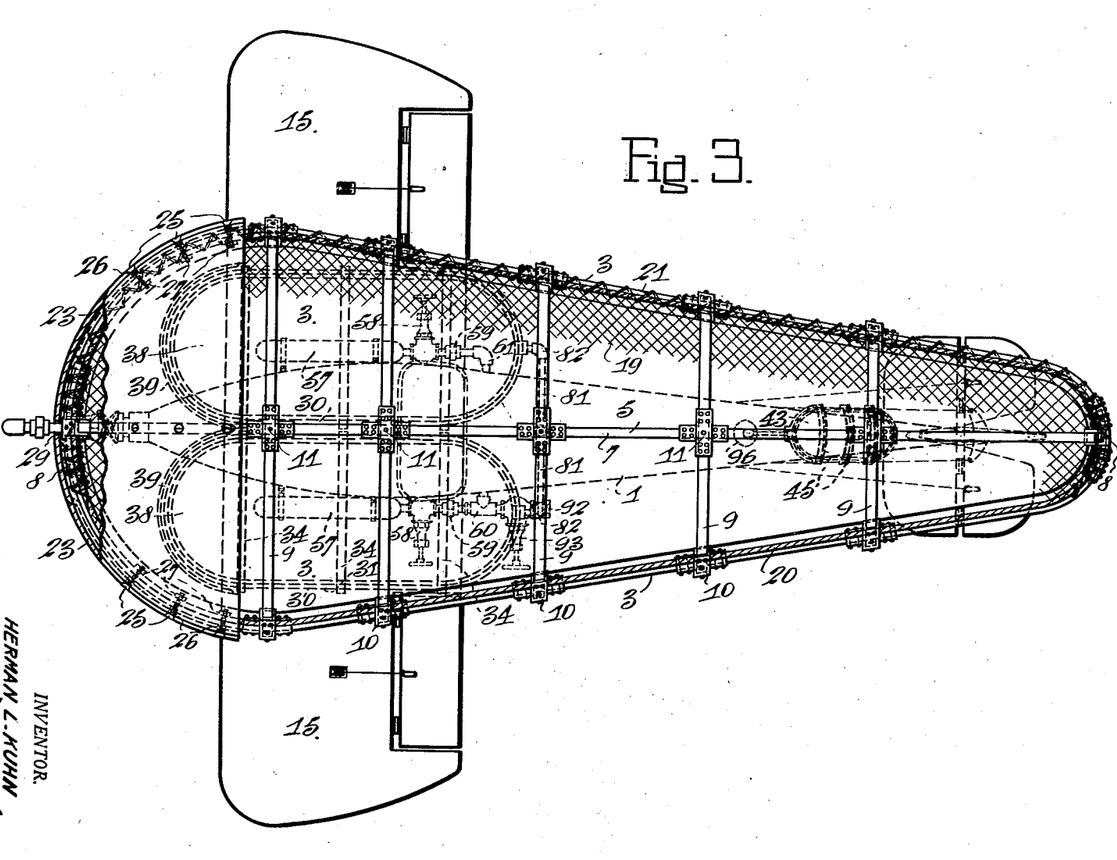
Figure 3 is a top plan view of the same.

The cap 22 is secured to the frame by wood screws 24 and bolts 25 with spacer-sleeves 26 and nuts 27. (See Figures 1 and 3.) The metallic fitting or brace 8 which is located at the front of the machine is provided with a hole or bore at its center through which passes freely the neck or stem 28 of the balloon, and through this neck or stem passes in gas-tight engagement the pipe 29 which leads the buoyant gas to the interior of the balloon.

The frames 30 of the lower twin balloons 3 are also formed of wood or light metallic bars 31 which conform with the contours of the balloons and at the back ends they are provided with flanges 32 having central holes for the passage of the inflation necks or stems 33 of the said balloons. These frames are secured to the lower wings and fuselage of the airplane by the frame loops 34 which can be made of wood or metal as desired.

Cord nets 35 are provided over the upper half of the surfaces of the balloons 3 and these nets are formed with border ropes 36 by which the nets are tied to the frame bars 31 by means of the cords 37. To prevent the balloons 3 from being flattened by the air resistance and also to reduce the air head resistance to a minimum these balloons are provided with metallic concave plates 38, constituting caps. These caps are formed with recesses 39 to provide a clearance for the tying cords 37. They are also formed with semi-circular flanges 40 which lap over the lower portion of the front loops 34 to which the caps are secured by screws or rivets 41, as best shown in Figure 1.

The frame of the rear balloon 4 is constructed similarly to that of balloons 3. It is composed of the longitudinal belt bar 42 which conforms to the contour of the balloon and which at the front end has a flange 43 that is provided with a central hole which freely passes the balloon bung or stem 44. This frame is secured to the fuselage by loops 45 and over the upper half of the balloon surface is a cord net 46 having a border rope 47 by which it is tied to the frame by the cord 48. The front of the balloon 4 is protected by a cap similar to those which protect balloons 3.

Figure 1:
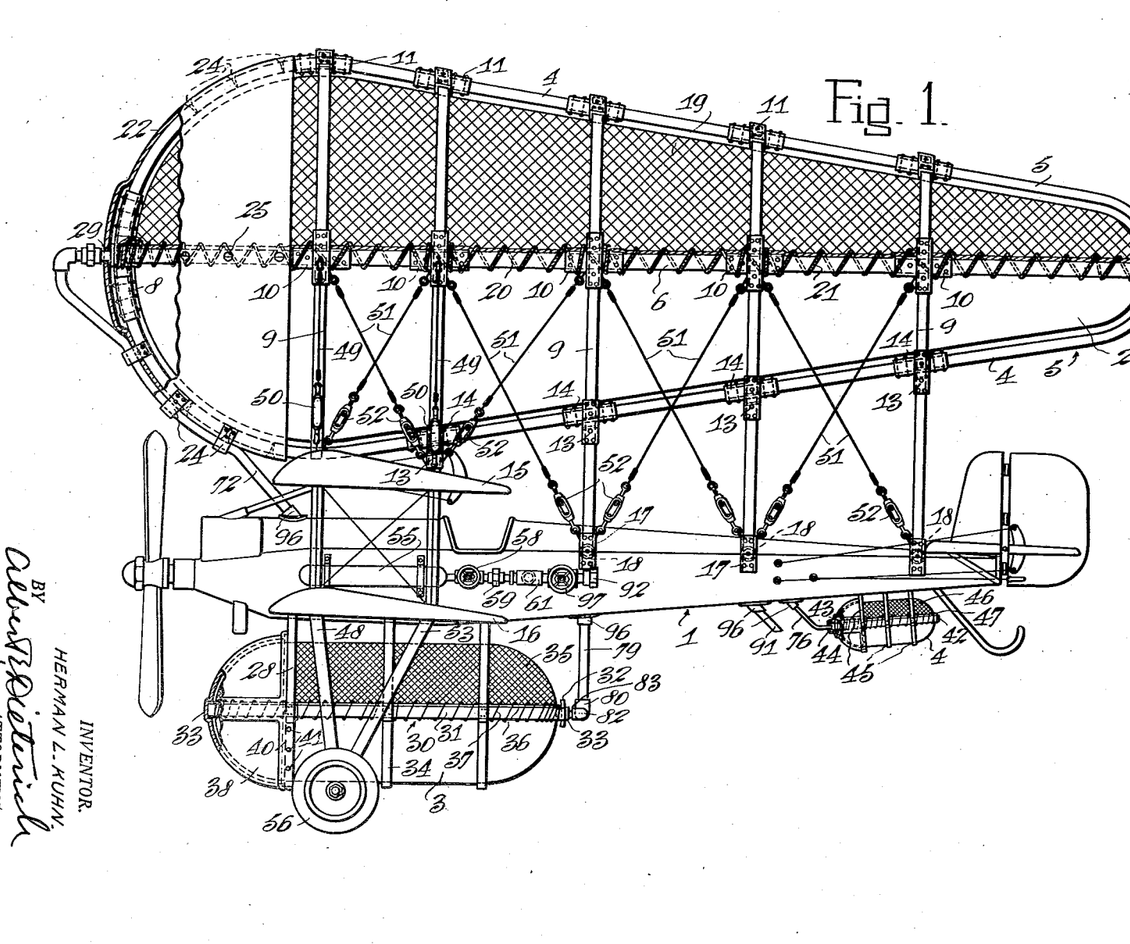
Figure 1 is a side elevation of an airplane equipped with my invention.
Figure 2:
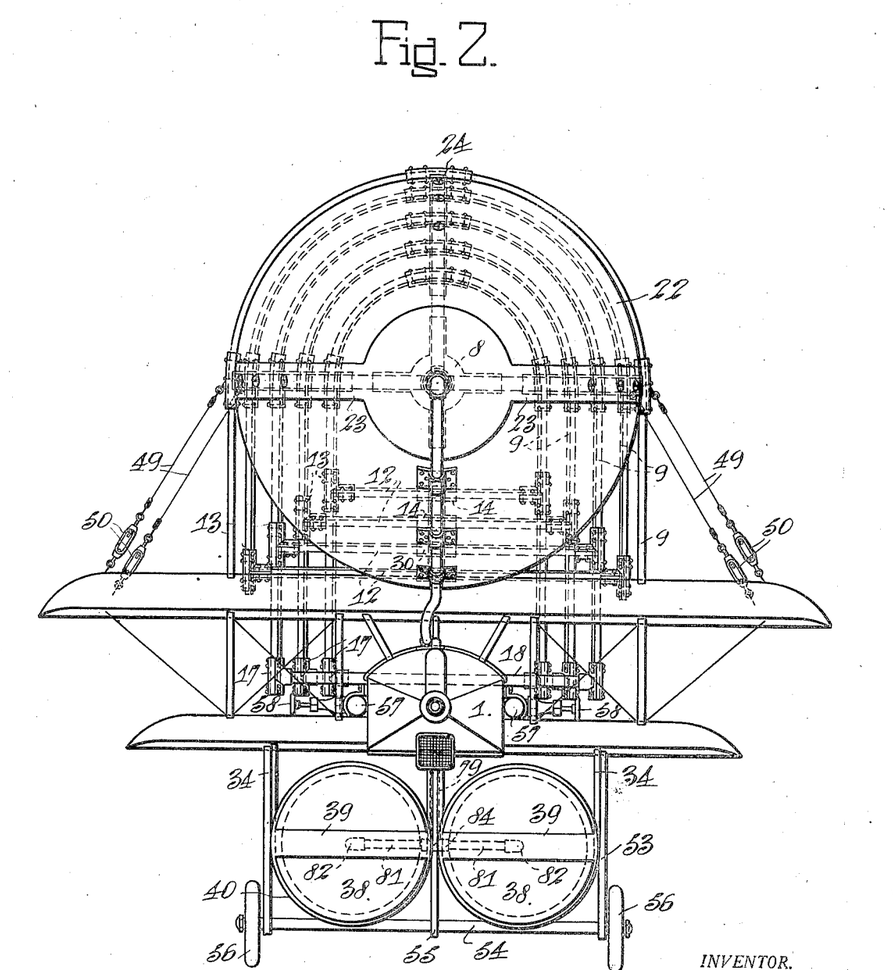
Figure 2 is a front elevation of the same.

In order to strengthen the upper frame 5 of the main balloon against side displacement it is provided with tension cables 49 and turnbuckles 50, at each side, as best shown in Figures 1 and 2, and in order to strengthen the frame against longitudinal displacement it is provided with tension cables 51 and turnbuckles 52 as shown.

The landing wheel brackets 53 differ from the standard construction in that they are located further apart to provide space for the lower lifting balloons 3. To give the required strength to the landing gear the rear axle is provided with a covering in the nature of a cross tube 54 and an extra set of brackets 55 is provided in the middle, as shown in Figure 2.

The landing wheels are indicated by 56. If preferred the landing wheels 53 may be omitted and ordinary skids used in their place since it is not necessary for the airplane to be run across the field to gain elevating speed in starting from the ground or from the water as is now common practice in land and hydroplanes.

57 designates a pair of high pressure gas storage tanks located one at each side of the fuselage. They are provided for the purpose of carrying an extra gas supply at high pressure in order to replace any gas lost from the lifting balloons and are particularly valuable in long flights where gas for replacement cannot be picked up readily from the landing fields.

Figure 4:
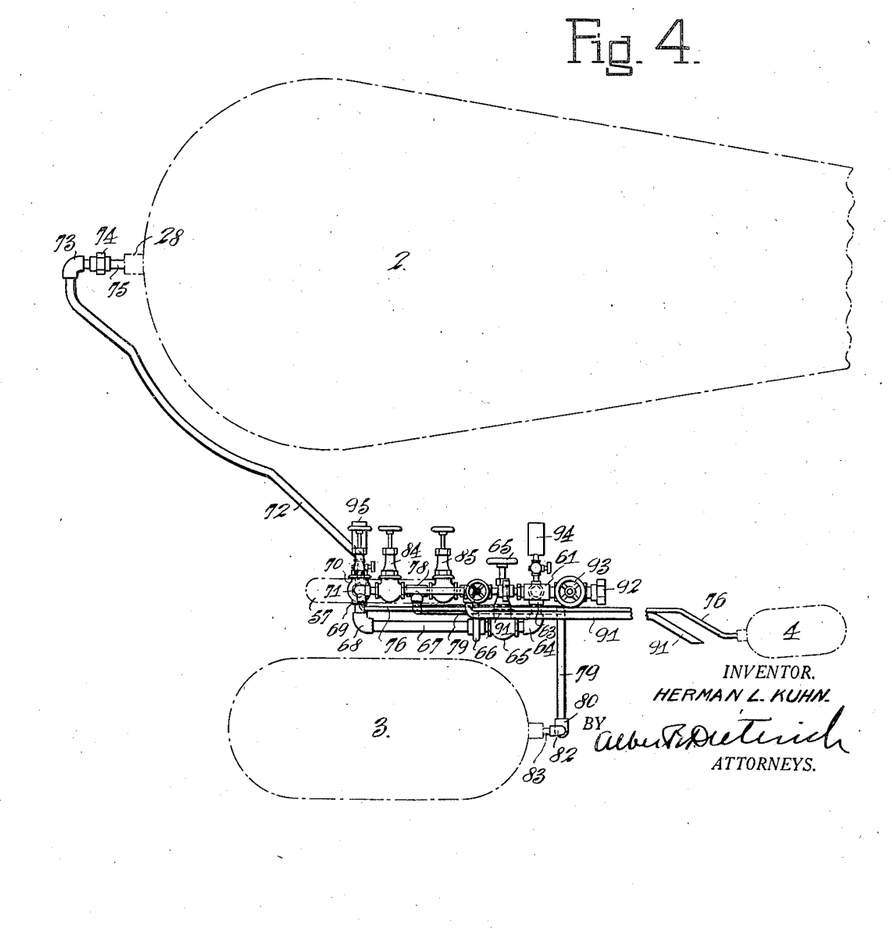
Figure 4 is a side elevation, somewhat diagrammatic, showing the apparatus for charging and controlling the lifting gas for the balloons.
Figure 5:
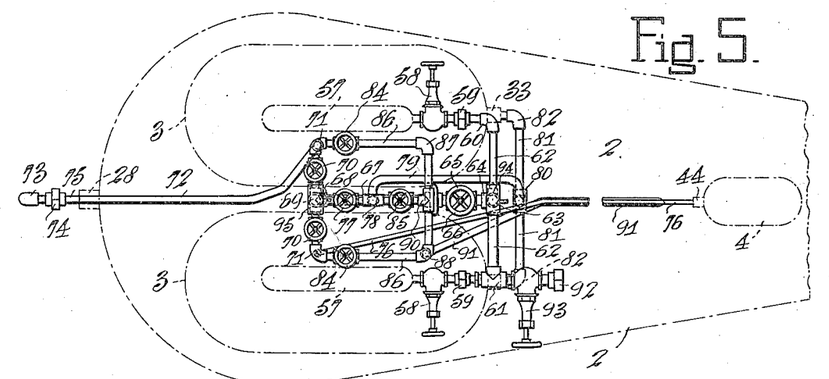
Figure 5 is a plan of the part shown in Figure 4.

The cylinders or storage tanks 57 are connected to the lifting balloons by the pipe system best shown in Figures 4 and 5 by reference to which it will be seen that gas from the cylinders 57 passes through valves 58, unions 59, elbow 60 and cross-coupling 61, through pipe 62 to the five-way cross-coupling 63. The gas is conducted down to elbow 64 through shut-off valve 65 and from thence through pressure-reducing valve 66, pipe 67, elbow 68 to the five-way fitting 69. From the opposite ends of this fitting 69 the gas passes to the valves 70 and from thence to the three-way elbows 71. From the right hand elbow 71 the gas is conducted through a tube 72 via elbow 73, union 74 to the pipe 75 that passes through the interior of the balloon 2. Connected to the left hand three-way elbow 71 is the tube 76 which conducts the gas to the tail balloon 4.

To the middle of the five-way fitting 69 there is connected by a nipple the valve 77 and that in turn connects to a T fitting 78. To this T fitting is connected the conducting tube 79 which leads to the T fitting 80. Connected to the T fitting 80 are the pipes or tubes 81 which connect through elbows 82 with the pipes 83 that lead into the interiors of the balloons 3.

Connected to the elbows 71 are the valves 84 and connected to the T fitting 78 is the valve 85. Connected to the valves 84 are the pipes 86, which connect in turn through elbows 87 and 88 to pipes 89 that connect with the T 90. The valve 85 also connects with the T 90.

Connected to the three-way elbow 88 is the discharging pipe 91.

92 is the half pipe union to connect with the outside source of gas supply in order to fill the lifting balloons before the airplane takes off. 93 is the valve which controls the flow of gas from the external source of gas supply to the balloons and storage tanks 57. 94 is a pressure gauge that registers the gas pressure from the storage cylinders 57 and also the outside gas charging source, while 95 is a pressure gauge that registers the pressure in the balloons after the gas pressure has been reduced by the pressure reducing valve 66. All of the holes in the airplane body where the various tubes pass through are reinforced by suitable flanges 96, as shown.

The pipe 72 is secured to the cap 19 by clamps 97, as shown.

*Operation*

To fill the balloon bags with gas the distributing gas circuit, as shown in Figures 4 and 5, must be connected to the external source of gas supply by the pipe union 92. The valve 93 is then opened, whereupon the gas flows to the T union 61 from whence it passes through the pipe 62, across fitting 63, through elbow 64, control valve 65, reducing valve 66, and elbow 68 to the five-way fitting or union 69. From the fitting 69 a portion of the gas goes to the gauge 95 where the pressure is indicated. From the fitting 69 the gas also flows to control valves 70 and 77. From the valve 70 the gas goes to the left and right side elbows 71, while from the valve 77 the gas goes to the T fitting 80. (Valves 84 and 85 must, of course, remain closed during the filling operation.)

The gas from the right side elbow 71 goes through pipe 72, elbow 73, union 74 and nipple pipe 75 into the large balloon 2. At the same time the gas flows from the T 78 through the tube 79 to the union 80, from which it passes via pipes 81 and elbows 82 to the nipples entering the right and left balloons 3. Gas also flows from the left side elbow 71 through the tube 76 to the small tail balloon 4.

Valves 84 and 85 when opened permit the gas from the inflated balloons to escape to the atmosphere. For instance, if the valve 85 is open (after having first closed valve 77) the gas from the inflated balloons 3—3 escapes to the atmosphere through the three-way elbow 88 and discharge tube 91.

To deflate the balloon 2, the right side valve 70 is closed and then the right hand valve 84 is opened. The gas escapes to the atmosphere through the right hand pipe 86, the elbow 87, T union 90, three-way elbow 60, discharge pipe 71 to the three-way elbow 88 and discharge tube 91.

To deflate the tail balloon 4 the left side valve 70 must be closed and the left side valve 84 must be opened. The gas then escapes through left hand pipe 86, three-way elbow 88 and discharge pipe 91.

It will be seen from the foregoing that the gas to the balloons from the source of supply and its exhaust from the balloons to the atmosphere can be independently controlled.

The purpose of the gas storage cylinders 57 is to enable replacement of the gases to be made to the balloons when necessary, in order to keep the gases in the balloons at the desired pressure. The pressure gauge 95 indicates the gas pressure in the balloons.

In virtue of the simultaneous lifting powers of the several balloons the airplane may be kept afloat in the air and all danger of its falling to earth is overcome.

The invention may be applied to motor driven airplanes, manually driven airplanes and gliders with equal facility.

In the embodiment of my invention illustrated in the accompanying drawings a motor driven bi-plane is shown and the lifting capacities of the several balloons 2, 3 and 4, are so designed as to sustain the greater part or all of the weight of the airplane and the balloon supporting structure. This enables the machine to take off more quickly and easily (avoiding long runs over the landing field to gain speed for lifting effect) and power plants of lesser power can be employed than is now possible with airplanes of corresponding size not equipped with my invention.

In case of motor trouble or in the event that a propeller blade, etc., breaks the impelling force stops. The plane, however, can remain in the air, thus giving the pilot plenty of time to maneuver the machine and bring it down to earth, if desired, with all the safety necessary. If it becomes necessary for the pilot to bring his ship down on water, the inflated gas balloons will keep the vessel from sinking.

When the full weight of the airplane is taken up by the lifting balloons, landing is effected by the driving force of the propeller and the adjustment of the elevators to head the craft toward the landing place. When landed with the balloons fully inflated, the vessel must of course be suitably anchored, as in the case of a dirigible. When preferred the landing may be effected by partially deflating the balloons or by combining partial deflation with direction propulsion through the use of the propeller and elevators.

The resistance offered by the blunt nose of the upper balloon is sufficient to prevent nose dives by the airplane. The only function the motor performs when the airplane is equipped with my invention is to propel the craft in the air at the desired speeds without the necessity of racing the motor to provide the lifting effect required in present day airplanes not equipped with my invention. My invention uses the advantageous features of the dirigible airships without employing their objectionable features. In the case of dirigible ships, they are at a disadvantage when it comes to landing, since they cannot land without the loss of a large amount of gas, and the larger ships especially require expensive mooring masts at the landing fields and the employment of large numbers of men as ground crew to bring the ship to the ground and anchor it. All these disadvantages are eliminated by the use of my invention.

As the weight of the airplane is taken up by the lifting balloons, the ascensional or lifting speed is greater than in the case of the ordinary, common airplane for the reason that two forces act simultaneously to produce a movement component in the direction; i. e., the force of levity acting vertically upward, and the force of the propeller acting horizontally forward give a forwardly and upwardly directed vector that brings the airplane to its required elevation more quickly than would be the case if the airplane were not provided with my lifting balloons.

The air resistance presented by the surfaces of the balloons is compensated for by the added lightness given by the balloons. If preferred, the lifting power of the balloons may be reduced to less than the weight of the vehicle as a whole and the action of the airplane as such may be used to give the added lifting effect necessary to keep the vehicle in the air.

By constructing the balloon frames as shown and described and attaching them to the airplane in the manner described herein, a rigid structure is obtained which will facilitate the maneuverability without imparting undue strain to the parts. The main gas bag is preferably shaped to conform to the general contour of the fuselage of the aeroplane and the various frame parts are preferably streamline, as is common practice in airplane construction.

By combining the gas bags with the skeleton frames of rigid structure they are kept from collapsing or buckling and thus the shifting of the center of gravity of the machine is avoided.

The provision of the caps over the front ends of the frames not only serves to present smooth surfaces to the air stream so as not to reduce the speed of the vehicle, but the caps also serve as a means of strengthening the front ends of the frames where the greatest pressures are encountered.

Changes in the specific details of construction, design and proportions of parts can, of course, be made without departing from the spirit of the invention within the scope of the appended claims.

What I claim is:

1. An aircraft comprising an airplane complete in itself and including a fuselage, bi-planes, landing gear and the usual flight controlling elevators and rudders; combined with dirigible balloons one located over the airplane with its longitudinal axis approximately parallel to that of the fuselage, and separate dirigible balloons located beneath the airplane at the front and back ends of the same.

2. An aircraft comprising an airplane complete in itself and including a fuselage, bi-planes, landing gear and the usual flight controlling elevators and rudders; combined with dirigible balloons one located over the airplane with its longitudinal axis approximately parallel to that of the fuselage, and separate dirigible balloons located beneath the airplane at the front and back ends of the same, and rigid frames containing said balloons and means securing said frames rigidly to the airplane fuselage.

3. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, and means to secure said loops rigidly to the wings and fuselage of the airplane.

4. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, and means to secure said loops rigidly to the wings and fuselage of the airplane, said means including vertical extensions of the loops, cross bars for each pair of extensions, a fitting coupling the ends of said cross bars to the ends of said loop extensions, said cross bars passing into the fuselage and being secured thereto.

5. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, means to secure said loops rigidly to the wings and fuselage of the airplane, laterally extending guy wires with turnbuckles connecting said frame adjacent the belt bar level to the wings of the airplane, and crossed diagonal guy wires with turnbuckles connecting adjacent loop extensions between their lower ends and the level of the belt bar of the frame.

6. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, and means to secure said loops rigidly to the wings and fuselage of the airplane, a rope net located over the upper half of the balloon within the frame, said net having its marginal edge tied to said belt bar.

7. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, and means to secure said loops rigidly to the wings and fuselage of the airplane, said means including vertical extensions of the loops, cross bars for each pair of extensions, a fitting coupling the ends of said cross bars to the ends of said loop extensions, said cross bars passing into the fuselage and being secured thereto, a rope net located over the upper half of the balloon within the frame, said net having its marginal edge tied to said belt bar.

8. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, means to secure said loops rigidly to the wings and fuselage of the airplane, laterally extending guy wires with turnbuckles connecting said frame adjacent the belt bar level to the wings of the airplane, and crossed diagonal guy wires with turnbuckles connecting adjacent loop extensions between their lower ends and the level of the belt bar of the frame, a rope net located over the upper half of the balloon within the frame, said net having its marginal edge tied to said belt bar.

9. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, means to secure said loops rigidly to the wings and fuselage of the airplane, a hemispherical metallic cap located over the front end of said skeleton frame, and means to secure the cap to the vertical and horizontal bars of said frame.

10. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, means to secure said loops rigidly to the wings and fuselage of the airplane, said means including vertical extensions of the loops, cross bars for each pair of extensions, a fitting coupling the ends of said cross bars to the ends of said loop extensions, said cross bars passing into the fuselage and being secured thereto, a hemispherical metallic cap located over the front end of said skeleton frame, and means to secure the cap to the vertical and horizontal bars of said frame.

11. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, means to secure said loops rigidly to the wings and fuselage of the airplane, laterally extending guy wires with turnbuckles connecting said frame adjacent the belt bar level to the wings of the airplane, crossed diagonal guy wires with turnbuckles connecting adjacent loop extensions between their lower ends and the level of the belt bar of the frame, a hemispherical metallic cap located over the front end of said skeleton frame, and means to secure the cap to the vertical and horizontal bars of said frame.

12. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, means to secure said loops rigidly to the wings and fuselage of the airplane, a rope net located over the upper half of the balloon within the frame, said net having its marginal edge tied to said belt bar, a hemispherical metallic cap located over the front end of said skeleton frame, and means to secure the cap to the vertical and horizontal bars of said frame.

13. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, means to secure said loops rigidly to the wings and fuselage of the airplane, said means including vertical extensions of the loops, cross bars for each pair of extensions, a fitting coupling the ends of said cross bars to the ends of said loop extensions, said cross bars passing into the fuselage and being secured thereto, a rope net located over the upper half of the balloon within the frame, said net having its marginal edge tied to said belt bar, a hemispherical metallic cap located over the front end of said skeleton frame, and means to secure the cap to the vertical and horizontal bars of said frame.

14. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, means to secure said loops rigidly to the wings and fuselage of the airplane, laterally extending guy wires with turnbuckles connecting said frame adjacent the belt bar level to the wings of the airplane, and crossed diagonal guy wires with turnbuckles connecting adjacent loop extensions between their lower ends and the level of the belt bar of the frame, a rope net located over the upper half of the balloon within the frame, said net having its marginal edge tied to said belt bar, a hemispherical metallic cap located over the front end of said skeleton frame, and means to secure the cap to the vertical and horizontal bars of said frame.

15. In aerial navigating machines, an airplane having the usual fuselage, wings, elevational and directional rudders and controls and a landing gear; balloons in rigid frames located in the landing gear beneath the wings, said frames including a belt bar and loops rigidly secured to said bar and embracing the balloons on their under sides and rigidly secured to the airplane, and a semi-spherical cap over the front end of said frame and including a flange overlying the front loop, and means to secure said cap to said front loop.

16. In a dirigible balloon structure for attachment to airplanes, a skeleton frame comprising longitudinal top, bottom and belt bars shaped to conform to the shape of the balloon, angle fittings at the junctures of said bars, means rigidly securing said bars and fittings together, a plurality of loop members rigidly secured to said belt and top bars and including parallelly disposed extensions, cross bars between the ends of said extensions for securing the frame to the fuselage of the airplane, and crossed guy wires between adjacent loop members, a balloon bag located within said skeleton frame, a nose cap carried by the front of the frame, and a net over the upper half of the balloon bag together with means for tying the lower edge of said net to the belt bar of the skeleton frame whereby the balloon bag is held within the confines of the skeleton frame and protected at its front end by said cap.

17. In an aircraft, an airplane complete in itself, a main lifting balloon and a rigid frame embracing the balloon and mounted on top of the airplane, front and back auxiliary balloons located in rigid frames mounted beneath the airplane at the front and rear thereof, and a system of pipes, control valves and gauges for conveying gas from an external source selectively to said balloons and for exhausting gas therefrom, said control valves and gauges being located in the body of the airplane in convenient reach of the pilot.

18. In an aircraft, an airplane complete in itself, a main lifting balloon and a rigid frame embracing the balloon and mounted on top of the airplane, front and back auxiliary balloons located in rigid frames mounted beneath the airplane at the front and rear thereof, and a system of pipes, control valves and gauges for conveying gas from an external source selectively to said balloons and for exhausting gas therefrom, said control valves and gauges being located in the body of the airplane in convenient reach of the pilot, the gas pipe for the main balloon extending upwardly and forwardly from the airplane body under the nose and entering the balloon through its front end.

19. In an aircraft, an airplane complete in itself, a main lifting balloon and a rigid frame embracing the balloon and mounted on top of the airplane, front and back auxiliary balloons located in rigid frames mounted beneath the airplane at the front and rear thereof, and a system of pipes, control valves and gauges for conveying gas from an external source selectively to said balloons and for exhausting gas therefrom, said control valves and gauges being located in the body of the airplane in convenient reach of the pilot, a pair of gas tanks mounted on the airplane and connected to said system of pipes for supply reserve gas to the bags.

20. In an aircraft, an airplane complete in itself, a main lifting balloon and a rigid frame embracing the balloon and mounted on top of the airplane, front and back auxiliary balloons located in rigid frames mounted beneath the airplane at the front and rear thereof, and a system of pipes, control valves and gauges for conveying gas from an external source selectively to said balloons and for exhausting gas therefrom, said control valves and gauges being located in the body of the airplane in convenient reach of the pilot, the gas pipe for the main balloon extending upwardly and forwardly from the airplane body under the nose and entering the balloon through its front end, a pair of gas tanks mounted on the airplane and connected to said system of pipes for supply reserve gas to the bags.

21. In a dirigible-airplane wherein is provided an airplane complete in itself, a main balloon unit mounted to and over the airplane and front and rear auxiliary balloon units mounted to and under the airplane, means for inflating and deflating said balloons, said means comprising a gas main connectible with an external source of supply, a shut-off valve in said main, a distributing duct from said main to each balloon, separate control valves for said ducts, and an outlet duct to atmosphere.

22. In a dirigible-airplane wherein is provided an airplane complete in itself, a main balloon unit mounted to and over the airplane and front and rear auxiliary balloon units mounted to and under the airplane, means for inflating and deflating said balloons, said means comprising a gas main connectible with an external source of supply, a shut-off valve in said main, a distributing duct from said main to each balloon, separate control valves for said ducts, an outlet duct to atmosphere, there being a pressure reducing valve in said main, and pressure gauges located at either side of said reducing valve for the purposes described.

23. In a dirigible-airplane wherein is provided an airplane complete in itself, a main balloon unit mounted to and over the airplane and front and rear auxiliary balloon units mounted to and under the airplane, means for inflating and deflating said balloons, said means comprising a gas main connectible with an external source of supply, a shut-off valve in said main, a distributing duct from said main to each balloon, separate control valves for said ducts, an outlet duct to atmosphere, there being a pressure reducing valve in said main, pressure gauges located at either side of said reducing valve, and auxiliary gas tanks connected with said main at the high pressure side of said reducing valve.

24. In combination with an airplane of the bi-plane type complete in itself, of a gas bag located over the airplane, said gas bag having a semi-spherical nose and tapering therefrom to the rear end, a rigid skeleton frame containing the gas bag and comprising a horizontal belt bar and a top and a bottom bar, the latter bars lying in a vertical plane, fittings clamping the ends of the frame bars together into a rigid structure, said horizontal and top and bottom bars conforming to the contour of the gas bag, a series of loops located in transverse vertical planes, fittings rigidly securing said loops to said horizontal and vertical bars, means to secure said loops rigidly to the wings and fuselage of the airplane, a hemispherical metallic cap located over the front end of said skeleton frame, and means to secure the cap to the vertical and horizontal bars of said frame, said cap having recesses for the horizontal bars and the adjacent end fitting.

HERMAN L. KUHN.